(12) United States Patent
Pattnaik et al.

(10) Patent No.: US 10,949,202 B2
(45) Date of Patent: *Mar. 16, 2021

(54) IDENTIFYING AND TRACKING FREQUENTLY ACCESSED REGISTERS IN A PROCESSOR

(71) Applicant: International Business Machines Corporation, Armonk, NY (US)

(72) Inventors: Pratap C. Pattnaik, Ossining, NY (US); Jessica H. Tseng, Fremont, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 70 days.

This patent is subject to a terminal disclaimer.

(21) Appl. No.: 15/979,657

(22) Filed: May 15, 2018

(65) Prior Publication Data

US 2019/0354371 A1 Nov. 21, 2019

Related U.S. Application Data

(63) Continuation of application No. 15/098,430, filed on Apr. 14, 2016, now Pat. No. 10,007,590.

(51) Int. Cl.
 *G06F 9/30* (2018.01)
 *G06F 9/32* (2018.01)

(52) U.S. Cl.
 CPC .......... *G06F 9/30098* (2013.01); *G06F 9/321* (2013.01)

(58) Field of Classification Search
 CPC .................................................. G06F 9/30098
 See application file for complete search history.

(56) References Cited

U.S. PATENT DOCUMENTS 6,336,160 B1 * 1/2002 Eickemeyer ........ G06F 9/30112
 711/1
6,915,356 B1 7/2005 Dwork
(Continued)

OTHER PUBLICATIONS

List of IBM Patents or Patent Applictions Treated as Related; (Appendix P), Filed May 15, 2018, 2 pages.
(Continued)

*Primary Examiner* — Michael J Metzger
(74) *Attorney, Agent, or Firm* — Cantor Colburn LLP; Kurt Goudy

(57) ABSTRACT

Embodiments include methods, computing systems and computer program products for identifying and tracking frequently accessed registers in a processor of a computing system. Aspects include: creating a list of top accessed registers of certain registers in processor, each register having a corresponding register usage counter, initializing each register usage counter, starting a register usage monitoring mode, examining each register usage counter, and updating list of top accessed registers, stopping register usage monitoring mode, and updating a register file partition assignment when the list of top accessed registers is identified. Once the list of top accessed registers is identified, stopping the programs and bring its threads of execution to quiescent, moving registers between register file partitions until all registers on the list of top accessed registers are in the fully-ported register file partition, and resuming executions of the program and its threads.

17 Claims, 5 Drawing Sheets

(56) References Cited

U.S. PATENT DOCUMENTS

| | | |
|---|---|---|
| 6,959,377 B2 | 10/2005 | Gold et al. |
| 7,529,915 B2 | 5/2009 | Gelinas et al. |
| 7,765,342 B2 * | 7/2010 | Whalley ................. G06F 8/441 710/49 |
| 8,225,076 B1 | 7/2012 | Coon et al. |
| 8,407,715 B2 | 3/2013 | Lee et al. |
| 9,069,546 B2 | 6/2015 | Alexander et al. |
| 9,229,695 B2 | 1/2016 | Gschwind et al. |
| 9,231,595 B2 | 1/2016 | Garcia |
| 2008/0040093 A1 * | 2/2008 | Sargaison ........... G06F 9/45504 703/28 |
| 2010/0077143 A1 | 3/2010 | Reid et al. |
| 2013/0007379 A1 | 1/2013 | Kegel et al. |
| 2013/0290680 A1 | 10/2013 | Keller et al. |
| 2014/0122842 A1 | 5/2014 | Abernathy et al. |
| 2014/0229938 A1 | 8/2014 | Tsirkin et al. |
| 2015/0046755 A1 | 2/2015 | Sethumadhavan et al. |
| 2015/0121040 A1 | 4/2015 | Weidner et al. |
| 2015/0143061 A1 * | 5/2015 | Khailany ................. G06F 9/38 711/154 |
| 2017/0300323 A1 | 10/2017 | Pattnaik et al. |

OTHER PUBLICATIONS

Authors et. al., "Zero Overhead Method for Starting and Stopping Performance Monitor Counters", IP.com No. 000019944, Oct. 13, 2003, pp. 1-3.

Chantrapornchai et al., "Register-Constrained Inclusion Scheduling for Imprecise Specification", Tencon 2004, 2004 IEEE Region 10 Conference, vol. B, pp. 160-163.

Ranganathan et al., "Counting Stream Registers: An Efficient and Effective Snoop Filter Architecture", Embedded Computer Systems (SAMOS) International Conference on Jul. 16-19, 2012, pp. 120-127.

* cited by examiner

IDENTIFYING AND TRACKING FREQUENTLY ACCESSED REGISTERS IN A PROCESSOR

DOMESTIC PRIORITY

This application is a continuation of U.S. patent application Ser. No. 15/098,430, filed Apr. 14, 2016, the content of which is incorporated by reference herein in its entirety.

BACKGROUND

The present disclosure relates generally to superscalar computing, and more particularly to methods, systems and computer program products for identifying and tracking frequently accessed registers in a superscalar processor.

Modern central processing units (CPU) have a superscalar out-of-order architecture. A superscalar CPU implements a form of instruction-level parallelism within a single processor. It allows faster CPU throughput and executes more instructions in a unit of time. A superscalar processor executes more than one instruction during a clock cycle by simultaneously dispatching multiple instructions to different-execution units on the processor such as an arithmetic logic unit, a shifter, or a multiplier. The superscalar aspect brings the benefit of 'workload optimization' (e.g. a single instruction multiple data streams (SIMD) engine optimizes vector processing). Out-of-order execution is a paradigm used in most high-performance microprocessors to make use of instruction cycles that would otherwise be wasted by a certain type of costly delay. A processor executes instructions in an order governed by the availability of input data, not necessarily in their original order in a program. In doing so, the processor can avoid being idle while waiting for the preceding instruction to complete and to retrieve data for the next instruction in a program, processing instead the next instructions which are able to run immediately and independently.

For a superscalar processor, large multi-ported registers are implemented to support multiple instructions being executed at the same time. The architected registers are allocated by a compiler or an application binary interface (ABI) definitions depending on the workload, some registers are used more than others. Register area can be reduced drastically if the number of register port is reduced for registers that are not accessed frequently. Only the frequently accessed registers are fully ported.

Therefore, heretofore unaddressed needs still exist in the art to address the aforementioned deficiencies and inadequacies.

SUMMARY

In one aspect, the present disclosure relates to a method for identifying and tracking frequently accessed registers in a superscalar processor. In certain embodiments, the method may include: initiating, by an operating system of the computing system, the creation of a list of top accessed registers in the processor, each register having a corresponding register usage counter; initializing each register usage counter; starting a register usage monitoring mode; examining each of the register usage counters; and updating the list of top accessed registers; stopping the register usage monitoring mode; and updating, a register file partition assignment when the list of top accessed registers is identified. Once the list of top accessed registers is identified, the method further includes: stopping the program currently running on the processor of computing system and bring its thread of execution to quiescent; comparing the list of top accessed registers against names of the registers of fully-ported register file partition; moving registers between register file partitions until all registers in the list of top accessed registers are in the fully-ported register file partition; and resuming executions of the program and its threads.

In another aspect, the present disclosure relates to a computing system for identifying and tracking frequently accessed registers in a superscalar processor. In certain embodiments, the computing system may include a memory having computer executable instructions; and a processor for executing the computer executable instructions. When the computer executable instructions are executed at the processor, the computer executable instructions cause the computing system to perform: initiating, by an operating system of the computing system, the creation of a list of top accessed registers in the processor, each register having a corresponding register usage counter; initializing each register usage counter; starting a register usage monitoring mode; examining each of the register usage counters; and updating the list of top accessed registers; stopping the register usage monitoring mode; and updating, a register file partition assignment when the list of top accessed registers is identified. Once the list of top accessed registers is identified, the method further includes: stopping the program currently running on the processor of computing system and bring its thread of execution to quiescent; comparing the list of top accessed registers against names of the registers of fully-ported register file partition; moving registers between register file partitions until all registers in the list of top accessed registers are in the fully-ported register file partition; and resuming executions of the program and its threads.

In yet another aspect, the present disclosure relates to a computer program product. In certain embodiments, the computer program product may include a non-transitory computer readable storage medium may store computer executable instructions. When the computer executable instructions are executed by a processor of a computing system, the computer executable instructions cause the computing system to perform: initiating, by an operating system of the computing system, the creation of a list of top accessed registers in the processor, each register having a corresponding register usage counter; initializing each register usage counter; starting a register usage monitoring mode; examining each of the register usage counters; and updating the list of top accessed registers; stopping the register usage monitoring mode; and updating, a register file partition assignment when the list of top accessed registers is identified. Once the list of top accessed registers is identified, the method further includes: stopping the program currently running on the processor of computing system and bring its thread of execution to quiescent; comparing the list of top accessed registers against names of the registers of fully-ported register file partition; moving registers between register file partitions until all registers in the list of top accessed registers are in the fully-ported register file partition; and resuming executions of the program and its threads.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1:
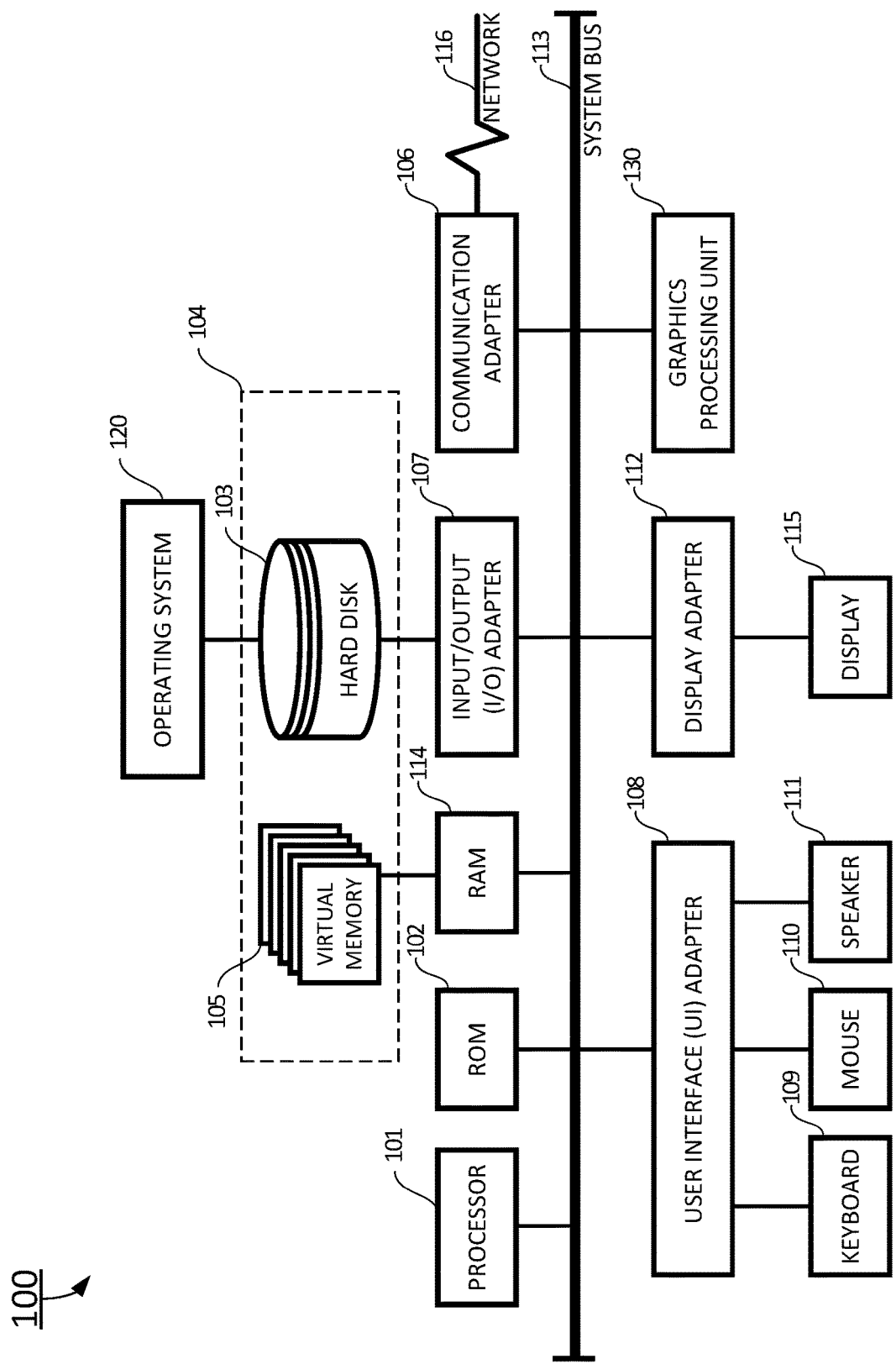
FIG. 1 is a block diagram illustrating an exemplary computing system for identifying and tracking frequently accessed registers in a superscalar processor according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "plurality" means two or more. The terms "comprising," "including," "carrying," "having," "containing," "involving," and the like are to be understood to be open-ended, i.e., to mean including but not limited to.

The term computer program, as used above, may include software, firmware, and/or microcode, and may refer to programs, routines, functions, classes, and/or objects. The term shared, as used above, means that some or all code from multiple modules may be executed using a single (shared) processor.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings FIGS. 1-5, in which certain exemplary embodiments of the present disclosure are shown. The present disclosure may, however, be embodied in many different forms and should not be construed as limited to the embodiments set forth herein; rather, these embodiments are provided so that this disclosure will be thorough and complete, and will fully convey the scope of the disclosure to those skilled in the art.

Referring to FIG. 1, an embodiment of a computing system 100 for generating functional test patterns for diagnostics, characterization and manufacture test and implementing the teachings herein. In this embodiment, the computing system 100 has a processor 101. In other embodiments, the computing system 100 may include one or more central processing units (processors) 101A, 101B, 101C, etc. (not shown in FIG. 1). In one embodiment, the processor 101 may include a reduced instruction set computer (RISC) microprocessor, and/or complex instruction set computing (CISC) microprocessor. In another embodiment, the processor 101 is a superscalar processor. The processor 101 is coupled to system memory 114 and various other components via a system bus 113. Read only memory (ROM) 102 is coupled to the system bus 113 and may include a basic input/output system (BIOS), which controls certain basic functions of the computing system 100.

FIG. 1 further depicts an input/output (I/O) adapter 107 and a network adapter 106 coupled to the system bus 113. I/O adapter 107 may be a small computing system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the computing system 100 may be stored in mass storage 104. A network adapter 106 interconnects bus 113 with an outside network 116 enabling the computing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the computing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the computing system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1. In certain embodiments, the system memory 114 may also include certain number of register usage counters 1013 (not shown in FIG. 1). In certain embodiments, the system memory 114 may also include a list of top accessed registers 1011 (not shown in FIG. 1) configured to identify and keep track of top accessed registers using the content of the certain number of register usage counters 1013 (not shown in FIG. 1). In certain embodiments, the system memory 114 may also include certain number of register usage counters 1013 (not shown in FIG. 1). In certain embodiments, the processor 101 may also include a list of top accessed registers 1011 (not shown in FIG. 1) configured to identify and keep track of top accessed registers using the content of the certain number of register usage counters 1013. In certain embodiments, the processor 101 may also include certain number of register usage counters 1013 (not shown in FIG. 1).

In certain embodiments, the network 116 may include symmetric multiprocessing (SMP) bus, a Peripheral Component Interconnect (PCI) bus, local area network (LAN), wide area network (WAN), telecommunication network, wireless communication network, and the Internet.

For a superscalar processor, large multi-ported registers are implemented to support multiple instructions being executed at the same time. Each architected register is mapped to one or more physical registers, depending on the processor implementation. The assignments of the architected registers to each instruction are allocated by a compiler or an application binary interface (ABI) definitions, depending on the workload type. In certain embodiments, a processor may include 32 general purpose registers (GPR).

A general purpose register file is a small amount of storage available as part of a CPU or other digital processor. Register files are (typically) addressed by mechanisms other than main memory and can be accessed more quickly. GPRs can store both data and addresses, i.e., they are combined Data/Address registers and rarely the register file is unified to include floating point as well. Almost all computers, load-store architecture or not, load data from a larger memory into registers where it is used for arithmetic, manipulated, or tested, by some machine instruction. Manipulated data is then often stored back in main memory, either by the same instruction or a subsequent one. Modern processors use either static or dynamic RAM as main memory, the latter often being implicitly accessed via one or more cache levels. A common property of computer programs is locality of reference: the same values are often accessed repeatedly and frequently used values held in registers improves performance. This is what makes fast registers (and caches) meaningful.

Figure 2:
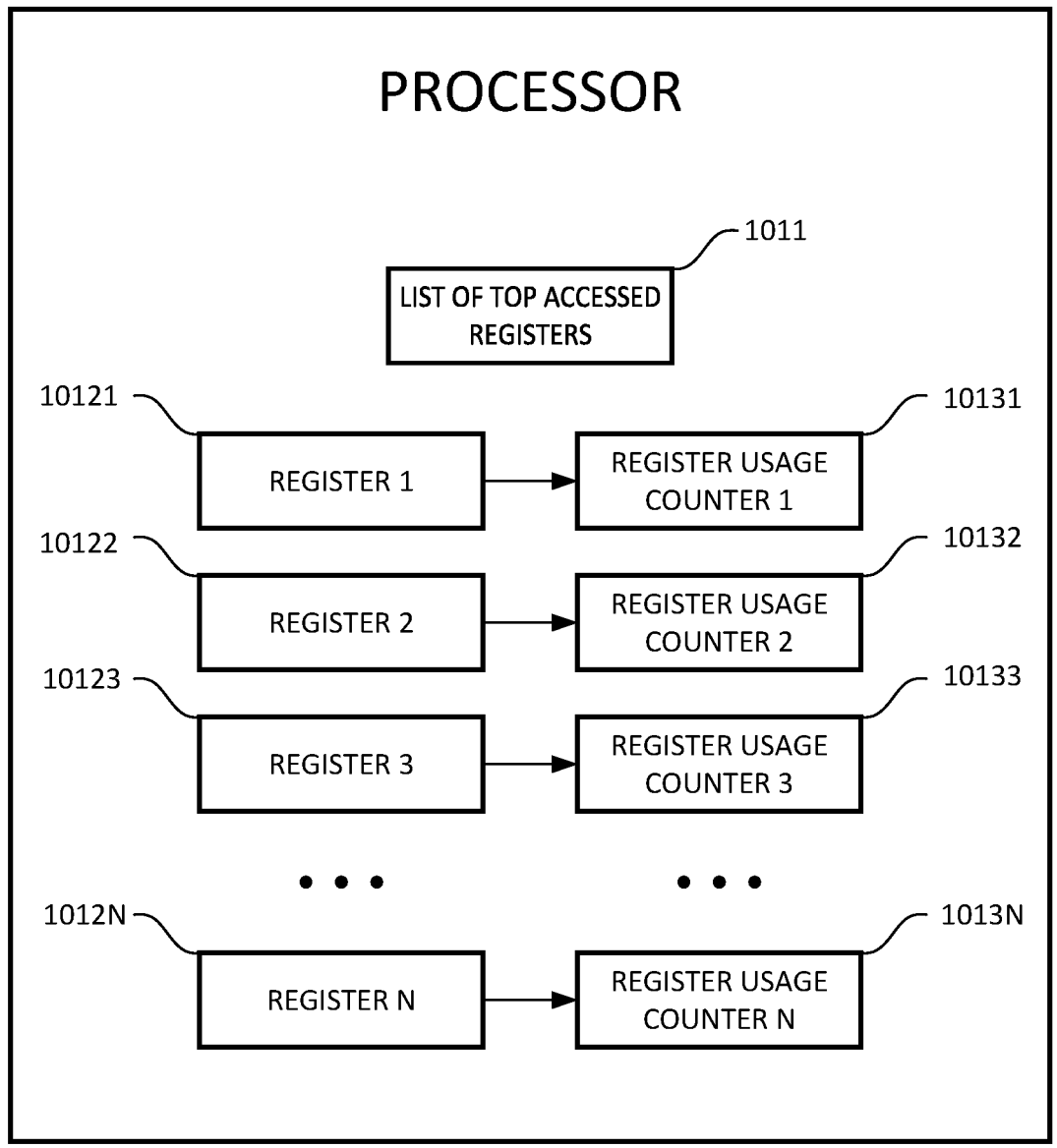
FIG. 2 is a structure block diagram of registers used by the superscalar processor according to certain exemplary embodiments of the present disclosure.

Referring now to FIG. 2, a structure block diagram of registers used by the superscalar processor is shown according to certain exemplary embodiments of the present disclosure. In certain embodiments, the processor 101 includes a number of architected registers 10121, 10122, 10123, . . . , and 1012N, where N is a positive integer. In one embodiment, the N is 32. The processor 101 also includes the same number of register usage counters 10131, 10132, 10133, . . . , and 1013N, one register usage counter for a corresponding architected register. During the register usage monitor mode, each of the register usage counters keeps track of the usage of the corresponding architected register. For example, the register usage counter 10131 keeps the number of times when the register 10121 is accessed, the register usage counter 10132 keeps the number of times when the register 10122 is accessed, and so on. In one embodiment, accessing a register may include the register is read from. In another embodiment, accessing a register may include the register is written to. In yet another embodiment, accessing a register may include the register is read from, and the register is written to.

According to certain embodiments of the present disclosure, the computing system 100 may include a list of top accessed registers 1011. In certain embodiments, the list of top accessed register 1011 resides within the processor 101. In another embodiment, the list of top accessed registers 1011 is a portion of the system memory 114. The list of the top accessed registers 1011 may have a predetermined maximum number of registers to be hold in the list of the top accessed registers 1011. For example, predetermined maximum number of registers of the list of the top accessed registers 1011 may include 2, 4, or 8. For the list of top accessed registers 1011 having the predetermined maximum number of registers 4, the list of top accessed registers 1011 may include 4 elements. Each of the 4 elements may include at least the name of the corresponding architected register. In certain embodiments, the computing system 100 may include 32 architected registers, but in order to reduce the size of fully-ported register file, the predetermined maximum number of architected registers reside within the fully-ported register file may be only 4. The other architected registers, not on the list of top accessed registers 1011, are implemented with small less-ported registers.

In certain embodiments, the register usage counters may be implemented with increment counters or decrement counters. When the register usage counter is an increment counter, the register usage counter may be initialized to a minimum value, such as 0x0. Every time when the register is accessed, the corresponding register usage counter is incremented by one. When the register usage counter is a 32-bit decrement counter, the register usage counter may be initialized to a maximum value, such as 0xFFFFFFFF. Every time when the register is accessed, the corresponding register usage counter is decremented by one. In certain embodiments, certain registers may be more important than others, so the register usage counters for these registers may be initialized to a predetermined value such that these registers are more likely to be selected during a register usage monitor mode or guarantee a spot in the list of top accessed registers 1011. For example, a register usage counter may be initialized to an offset value 0xFFFF for an increment counter or a decrement counter.

In certain embodiments, the register usage counter is said to reach a threshold value when the content of the register usage counter equals to the certain value. For example, when the threshold value is 0x100, and the register usage counter is incremented from 0x0 and up, as the corresponding register is accessed. When the register is accessed 256 times, the content of the register usage counter reach 256 or 0x100. For example, when the threshold value is 0x100, and the register usage counter is decrement from 0x200 and down, as the corresponding register is accessed. When the register is accessed 256 times, the content of the register usage counter reaches 256 or 0x100.

In certain embodiments, the register usage counter is said to pass a threshold value when the content of the register usage counter is incremented from a value less than the threshold value to a value greater than the threshold value for an increment counter, or when the content of the register usage counter is decremented from a value greater than the threshold value to a value less than the threshold value for a decrement counter. For example, when the threshold value is 0x100, and the register usage counter is incremented from 0x0 and up, as the corresponding register is accessed. When the register is accessed 256 times, the content of the register usage counter is said to reach 256 or 0x100. When the register is accessed 257 times (or 0x101), the content of the register usage counter is said to pass the threshold value (256 or 0x100). When the register usage counter is incremented from 0x200 and down, as the corresponding register is accessed. When the register is accessed 256 times, the content of the register usage counter is said to reach 256 or 0x100. When the register is accessed 257 times (the content of the register usage counter becomes 0xFF), the content of the register usage counter is said to pass the threshold value (256 or 0x100).

In one embodiment, the register usage counter may be an increment counter. In another embodiment, the register usage counter may be a decrement counter. In yet another embodiment, some of the register usage counters may be increment counters and other register usage counters may be decrement counters. Each of the register usage counters may be of different type and initialized to a different predetermined value. In one embodiment, the predetermined value may be zero for an increment counter. In another embodiment, the predetermined value may be a maximum for a decrement counter.

In certain embodiments, the processor 101 may have a partitioned register file that includes a fully-ported register file partition and a less-ported register file partition. The processor 101 may have register file partition assignments. The register file partition assignments are mappings of each of the architected registers to the register file partition. The registers on the list of the top access registers 1011 may be mapped to the fully-ported register file partition and the other registers not on the top accessed register list 1011 may be mapped to the less-ported register file partition.

In certain embodiments, each register in the fully-ported register file partition has certain number of ports to support maximum number of concurrent accesses, defined by the architecture of the processor, in the same processor cycle. For example, if the processor has an issue width of two instructions and each instruction can read up to two registers, the register in the fully-ported register file would have 4 read ports. However, the number of concurrent accesses to a register in a processor cycle is usually far less than the maximum allowed. To save die area, the less-ported register file has reduced number of port to each register. An issuing logic takes this into account and only issue instructions that do not exceed the supported register ports each processor cycle.

Figure 3:
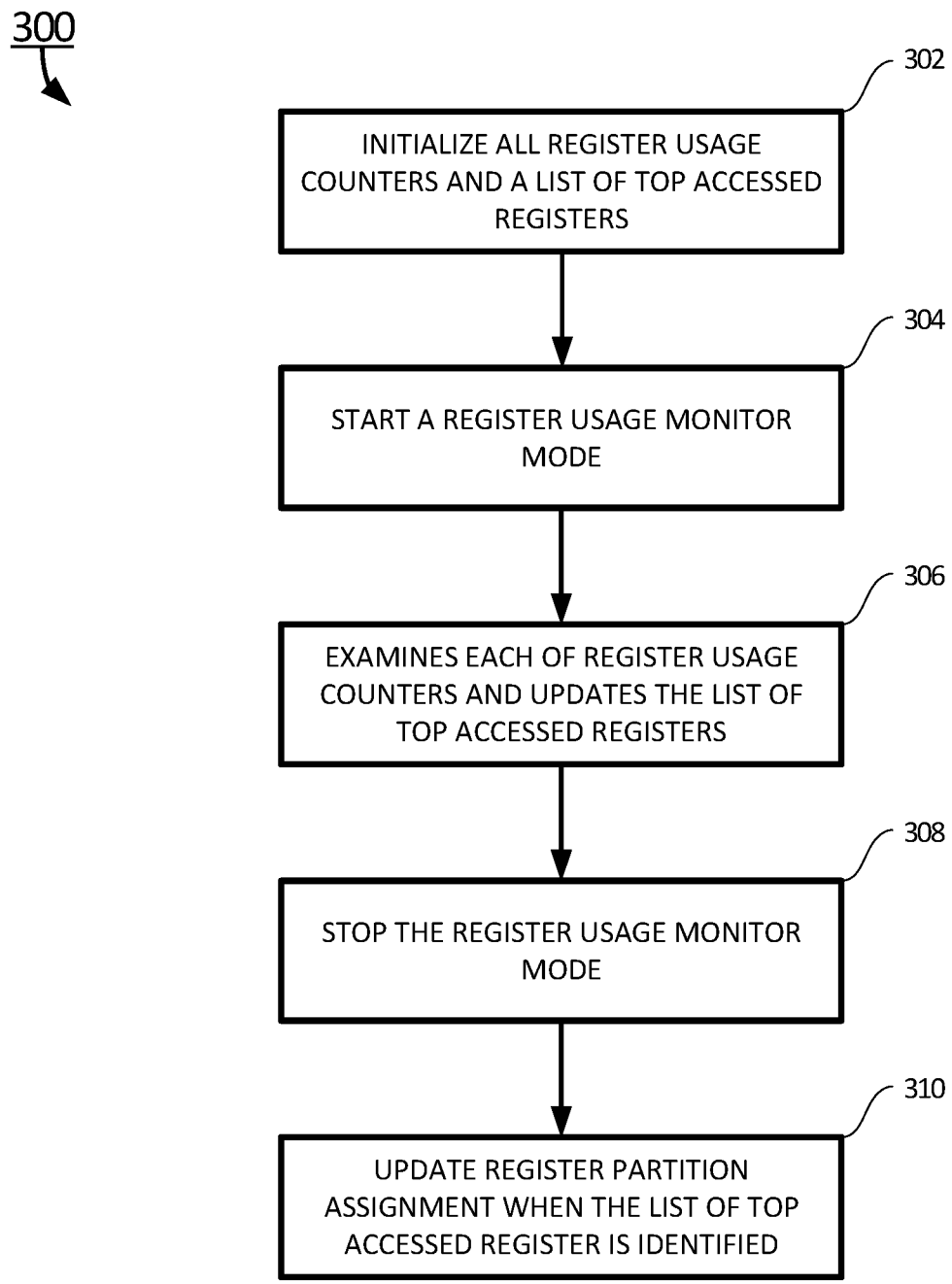
FIG. 3 is flow chart of an exemplary method of identifying and tracking frequently accessed registers in the superscalar processor according to certain embodiments of the present disclosure.

In one aspect, the present disclosure relates to a method 300 for identifying and tracking frequently accessed registers in a superscalar processor, as shown in FIG. 3 according to certain embodiments of the present disclosure.

At block 302, as a new workload is brought into processor for execution or a switch of different workload such as a context switch, the operating system 120 of the computing system 100, as shown in FIG. 1, may initiate the process of identifying and tracking frequently accessed registers in a superscalar processor by first initializing all register usage counters 10131, 10132, 10133, . . . , and 1013N and a list of top accessed register 1011. In certain embodiments, the processor 101 includes a number of architected registers 10121, 10122, 10123, . . . , and 1012N, where N is a positive integer. In one embodiment, the N is 32. The processor 101 also includes the same number of register usage counters 10131, 10132, 10133, . . . , and 1013N, one register usage counter for a corresponding architected register. In one embodiment, a predetermined maximum number of registers in the list of top accessed register 1011 is 2. In another embodiment, a predetermined maximum number of registers in the list of top accessed register 1011 is 4. The assignment of architected registers 10121, 10122, 10123, . . . , and 1012N to each instruction are allocated by a compiler or an application binary interface (ABI) definitions. Depending on workload of a program running on the processor 101, some architected registers are accessed more than others. The register usage counters 10131, 10132, 10133, . . . , and 1013N are used to keep track the activities by each of corresponding registers 10121, 10122, 10123, . . . , and 1012N.

During the context switch, the operating system 120 initializes the list of top accessed register 1011 to 0, and initializes the register usage counters 10131, 10132, 10133, . . . , and 1013N. Each of the register usage counters 10131, 10132, 10133, . . . , and 1013N may be initialized to a different predetermined value, respectively.

At block 304, after the initialization process, the operating system 120 may start a register usage monitor mode to monitor the register usages and find certain number of top accessed registers. In one embodiment, the certain number of top accessed registers may be the predetermined maximum number of registers in the list of top accessed register 1011. Under the register usage monitor mode, the register usage counter 10131 keeps the number of times when the register 10121 is accessed, the register usage counter 10132 keeps the number of times when the register 10122 is accessed, and so on. In one embodiment, accessing a register may include the register is read from. In another embodiment, accessing a register may include the register is written to. In yet another embodiment, accessing a register may include the register is read from, and the register is written to.

At block 306, the processor 101 may examine the content of each of the register usage counters 10131, 10132, 10133, . . . , and 1013N, and try to identify the predetermined maximum number of top accessed registers in the computing system 100 and select these top accessed registers in the list of top accessed register 1011. The list of top accessed registers 1011 may be initialized to 0 and add a register to the list of top accessed registers 1011 when the register usage counter for the corresponding register has reached or pass a predetermined threshold, until the list of top accessed registers 1011 is full. This block 306 will be described in detail in a separate FIG. 4 according to certain embodiments of the present disclosure.

At block 308, the processor 101 may terminate the register usage monitor mode when the list of top accessed registers 1011 has reached the predetermined maximum number of registers in the list of top accessed register 1011.

At block 310, once the list of top accessed registers 1011 is identified, the processor 101 may update a register file partition assignment according to the list of top accessed registers 1011 such that only the registers on the list of top accessed registers 1011 are fully-ported and some of the less frequently accessed registers are removed from the fully-ported register file partition to the less-ported register file partition to reduce register file area. This block 310 will be described in detail in a separate FIG. 5 according to certain embodiments of the present disclosure.

Figure 4:
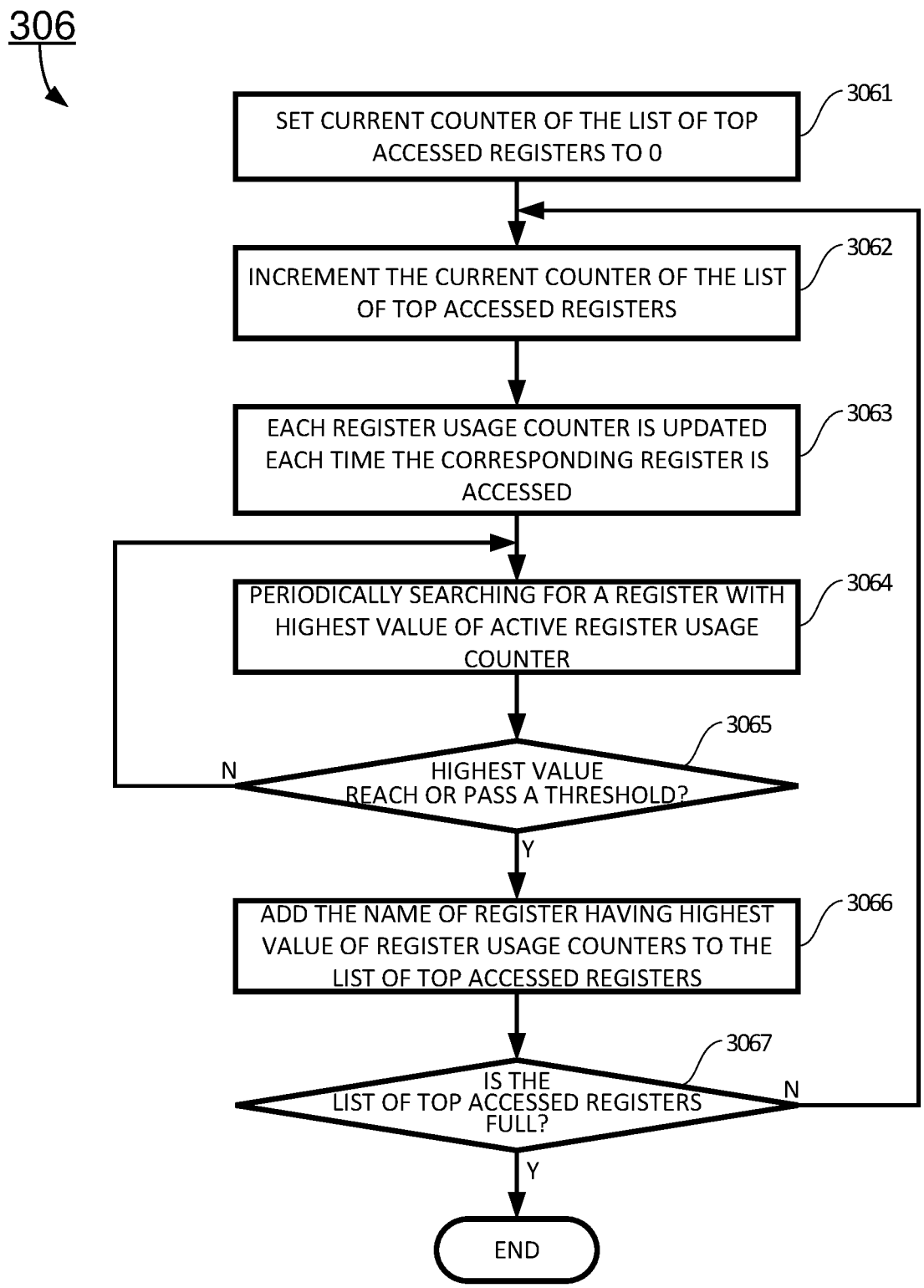
FIG. 4 is a flow chart of an exemplary method of identifying a list of top accessed registers according to certain embodiments of the present disclosure.

Referring now to FIG. 4, a flow chart of an exemplary method 306 of identifying the list of top accessed registers is shown according to certain embodiments of the present disclosure.

At block 3061, the processor 101 may set a current counter of the list of top accessed registers 1011 to zero at the beginning.

At block 3062, the program may increment the current counter of the list of top accessed registers 1011 by one to identify a next register to be moved to the list of top accessed register 1011. For the first time, the current counter of the list of top accessed registers 1011 is set to 1.

At block 3063, during the execution of the program, each of the registers 10121, 10122, 10123, . . . , and 1012N may be accessed, and each of the register usage counters 10131, 10132, 10133, . . . , and 1013N is incremented when a corresponding register is accessed. In one embodiment, accessing a register may include reading from the register. In another embodiment, accessing a register may include writing to the register. In yet another embodiment, accessing a register may include reading from the register, and/or writing to the register. Accessing to the architected registers 10121, 10122, 10123, . . . , and 1012N may be concurrent and independent of each other, and therefore, incrementing the register usage counters 10131, 10132, 10133, . . . , and 1013N may also be concurrent and independent of each other.

At block 3064, the processor 101 may periodically scan the register usage counters 10131, 10132, 10133, . . . , and 1013N to find an active register usage counter that has the highest value of the active register usage counters. Such scanning may be performed in a predetermined interval. For example, in one embodiment, the predetermined interval may be 5 seconds. In another embodiment, the predetermined interval may be 1 processor time unit.

At query block 3065, every time when the processor 101 exits from block 3064, the processor 101 obtains a highest value of the active register usage counters. This concludes one successful periodic search. The highest value may correspond to specific register. For example, if the highest value is from the register usage counter 10132, the register may be register 10122. The processor 101 may check whether the highest value has reached and/or passed a predetermined threshold value for the register usage counter 10132.

The processor 101 continues to block 3066 when the highest value has reached and/or passed the predetermined threshold value for the register usage counter 10132. Otherwise, the processor 101 continues to block 3064 and wait for next periodic search.

At block 3066, the processor 101 adds the name of register corresponding to the highest value of register usage counters to the list of top accessed registers 1011. For example, the name of architected register 10122 will be added to the list of top accessed registers 1011. Once this register 10122 is added to the list of top accessed registers 1011, its usage counter becomes inactive and may not be searched by the periodic search in block 3064. Every time a successful search is performed, the name of a register with highest access is added to the list of top accessed register 1011.

At query block 3067, the processor determines whether the list of top accessed registers 1011 is full. That means the processor 101 checks if the current counter of the list of top accessed registers 1011 equals to the predetermined maximum number of registers in the list of top accessed register 1011. The list of top accessed registers 1011 is full, when the current counter of the list of top accessed registers 1011 equals to the predetermined maximum number of registers in the list of top accessed register 1011. The list of top accessed registers 1011 is not full, when the current counter of the list of top accessed registers 1011 is less than the predetermined maximum number of registers in the list of top accessed register 1011.

In certain embodiments, the processor may exit the block 306 when the list of top accessed registers 1011 is full. Otherwise, the program proceeds to block 3062 to increment the current counter of the list of top accessed registers 1011, and search for the next architected register that has the highest value of register usage counters.

As described in FIG. 3, the processor 101 may terminate the register usage monitor mode at block 308 and continues to block 310.

Figure 5:
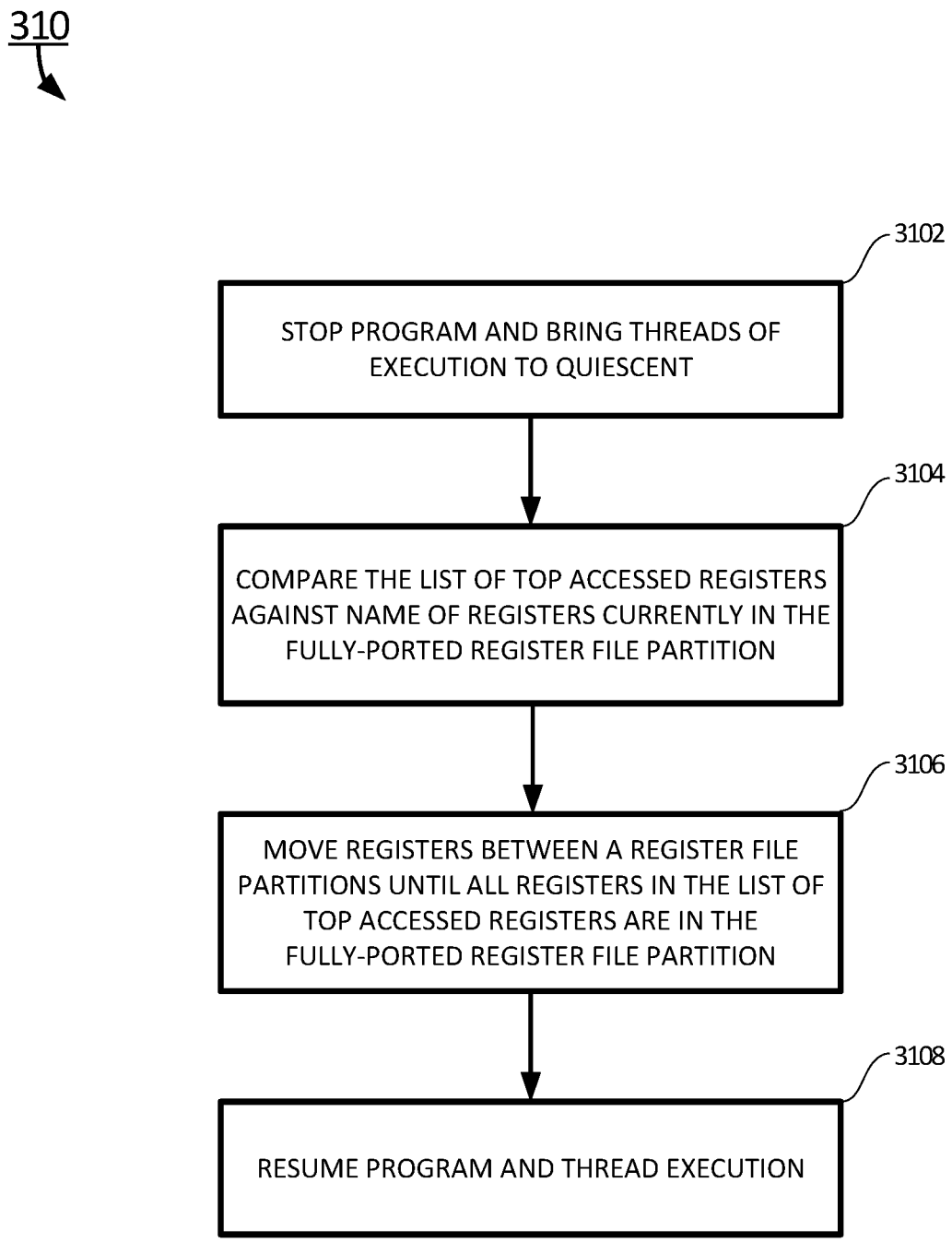
FIG. 5 is a flow chart of an exemplary method of updating a register file partition assignment when the list of top accessed registers is identified according to certain embodiments of the present disclosure.

Referring now to FIG. 5, a flow chart of an exemplary method 310 of updating a register file partition assignment when the list of top accessed registers is identified is shown according to certain embodiments of the present disclosure.

At block 3102, the processor 101 of the computing system 100 may stop the program running on the processor 101, and bring its thread of execution to quiescent such that no data is lost during the process of updating the register file partition assignment.

At block 3104, once the list of top accessed registers 1011 is identified, all the registers on the list of top accessed register 1011 need to be mapped to a fully-ported register file partition. The processor 101 compares the registers on the list of top accessed register 1011 against registers of fully-ported register file partition.

At block 3106, in certain embodiments, when a register in the list of top accessed registers 1011 is previously mapped to a less-ported register file partition, the content of the register is preserved and moved to a register entry of the fully-ported register file partition. The register entry of the register in the less-ported register file partition is free-up and may be allocated to other registers.

Similarly, if a register is previously mapped to the fully-ported register file partition and the register is not currently in the list of top accessed registers 1011, the content of the register is preserved and moved to a register entry of the less-ported register. Its register entry in the fully-ported register file may be free-up and may be allocated to other frequently accessed registers.

At block 3108, once the registers on the list of top accessed registers 1011 have been mapped to the fully-ported register file partition, the processor 101 may resume executions of the program and its thread.

In another aspect, the present disclosure relates to a computing system for identifying and tracking frequently accessed registers in a superscalar processor. The computing system may include a memory having computer executable instructions; and a processor for executing the computer executable instructions. When the computer executable instructions are executed at the processor, the computer executable instructions cause the computing system to perform: initiating, by an operating system of the computing system, the creation of a list of top accessed registers in the processor, each register having a corresponding register usage counter; initializing each register usage counter; starting a register usage monitoring mode; examining each of the register usage counters; and updating the list of top accessed registers; stopping the register usage monitoring mode; and updating, a register file partition assignment when the list of top accessed registers is identified. Once the list of top accessed registers is identified, the method further includes: stopping the program currently running on the processor of computing system and bring its thread of execution to quiescent; comparing the list of top accessed registers against names of the registers of fully-ported register file partition; moving registers between register file partitions until all registers in the list of top accessed registers are in the fully-ported register file partition; and resuming executions of the program and its threads.

In yet another aspect, the present disclosure relates to a computer program product. The computer program product may include a non-transitory computer readable storage medium storing computer executable instructions. When the computer executable instructions are executed by a processor of a computing system, the computer executable instructions cause the computing system to perform: initiating, by an operating system of the computing system, the creation of a list of top accessed registers in the processor, each register having a corresponding register usage counter; initializing each register usage counter; starting a register usage monitoring mode; examining each of the register usage counters; and updating the list of top accessed registers; stopping the register usage monitoring mode; and updating, a register file partition assignment when the list of top accessed registers is identified. Once the list of top accessed registers is identified, the method further includes: stopping the program currently running on the processor of computing system and bring its thread of execution to quiescent; comparing the list of top accessed registers against names of the registers of fully-ported register file partition; moving registers between register file partitions until all registers in the list of top accessed registers are in the fully-ported register file partition; and resuming executions of the program and its threads.

The present disclosure may be a computing system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of identifying and tracking frequently accessed registers in a processor of a computing system, comprising:
   initiating, by an operating system of the computing system, the creation of a list of top accessed registers of a plurality of architected registers in the processor, wherein each of the plurality of registers comprises a corresponding register usage counter;
   initializing each of the plurality of register usage counters;
   starting a register usage monitoring mode;
   examining each of the plurality of the register usage counters, and updating the list of top accessed registers;
   stopping the register usage monitoring mode; and
   updating a register file partition assignment when the list of top accessed registers is identified;
   wherein the examining each of the plurality of the register usage counters comprises:
   setting a current register counter of the list of top accessed registers to 0;
   incrementing the current register counter of the list of top accessed registers by one;
   periodically searching for a register having highest value of register usage counter from a plurality of registers not in the list of top accessed registers while each of the plurality of register usage counters is incremented when the corresponding register is accessed;
   checking if the register having highest value of register usage counter reaches or passes a predetermined threshold when the register is found;
   adding the register found from the plurality of registers not in the list of top accessed registers to the list of top accessed registers when the register having highest value of register usage counter reaches or passes the predetermined threshold, and exiting current searching period when the register having highest value of register usage counter does not reach the predetermined threshold;
   checking whether the list of top accessed registers reaches a predetermined maximum number of registers in the list of top accessed registers; and
   incrementing the current register counter of the list of top accessed registers and continuing periodic searching when the list of top accessed registers does not reach the predetermined maximum number of registers in the list of top accessed registers, and exiting the examining each of the plurality of the register usage counters when the list of top accessed registers reaches the predetermined maximum number of registers in the list of top accessed registers.

2. The method of claim 1, wherein initializing each of the plurality of register usage counters comprises:
   initializing one of the plurality of register usage counters to a minimal value;
   initializing one of the plurality of register usage counters to a maximum value; and
   initializing one of the plurality of register usage counters to a predetermined value.

3. The method of claim 2, further comprising incrementing the register usage counter when the register corresponding to the register usage counter is accessed.

4. The method of claim 3, wherein the incrementing the register usage counter comprises:
   decreasing the register usage counter value when the decrement counter is used; and
   increasing the register usage counter value when the increment counter is used.

5. The method of claim 4, wherein a register is accessed:
   when the register is read from;
   when the register is written to; or
   when the register is read from or the register is written to.

6. The method of claim 1, wherein updating the register file partition assignment comprises:

stopping the program currently running on the processor of computing system and bringing its threads of execution to quiescent;

comparing the list of top accessed registers against names of the registers of a fully-ported register file partition;

moving registers between the fully-ported register file partition and a less-ported register file partition until all registers on the list of top accessed registers are in the fully-ported register file partition; and resuming executions of the program and its threads.

7. A computing system for identifying and tracking frequently accessed registers in a processor of a computing system, comprising a memory storing computer executable instructions for the computing system, and a processor for executing the computer executable instructions, the computer executable instructions cause the processor to perform comprising:

initiating, by an operating system of the computing system, the creation of a list of top accessed registers of a plurality of architected registers in the processor, wherein each of the plurality of registers comprises a corresponding register usage counter;

initializing each of the plurality of register usage counters;

starting a register usage monitoring mode;

examining each of the plurality of the register usage counters, and updating the list of top accessed registers;

stopping the register usage monitoring mode; and updating, a register file partition assignment when the list of top accessed registers is identified;

wherein the examining each of the plurality of the register usage counters comprises:

setting a current register counter of the list of top accessed registers to 0;

incrementing the current register counter of the list of top accessed registers by one;

periodically searching for a register having highest value of register usage counter from a plurality of registers not in the list of top accessed registers while each of the plurality of register usage counters is incremented when the corresponding register is accessed;

checking if the register having highest value of register usage counter reaches or passes a predetermined threshold when the register is found;

adding the register found from the plurality of registers not in the list of top accessed registers to the list of top accessed registers when the register having highest value of register usage counter reaches or passes the predetermined threshold, and exiting current searching period when the register having highest value of register usage counter does not reach the predetermined threshold;

checking whether the list of top accessed registers reaches a predetermined maximum number of registers in the list of top accessed registers; and incrementing the current register counter of the list of top accessed registers and continuing periodic searching when the list of top accessed registers does not reach the predetermined maximum number of registers in the list of top accessed registers, and exiting the examining each of the plurality of the register usage counters when the list of top accessed registers reaches the predetermined maximum number of registers in the list of top accessed registers.

8. The computing system of claim 7, wherein initializing each of the plurality of register usage counters comprises:

initializing one of the plurality of register usage counters to a minimal value;

initializing one of the plurality of register usage counters to a maximum value; and initializing one of the plurality of register usage counters to a predetermined value.

9. The computing system of claim 8, further comprising incrementing the register usage counter when the register corresponding to the register usage counter is accessed.

10. The computing system of claim 9, wherein the incrementing the register usage counter comprises:

decreasing the register usage counter value when the decrement counter is used; and increasing the register usage counter value when the increment counter is used.

11. The computing system of claim 10, wherein a register is accessed:

when the register is read from;

when the register is written to; or when the register is read from or the register is written to.

12. The computing system of claim 7, wherein updating the register file partition assignment comprises:

stopping the program currently running on the processor of computing system and bringing its threads of execution to quiescent;

comparing the list of top accessed registers against names of the registers of fully-ported register file partition;

moving registers between the fully-ported register file partition and a less-ported register file partition until all registers on the list of top accessed registers are in the fully-ported register file partition; and resuming executions of the program and its threads.

13. A computer program product for identifying and tracking frequently accessed registers in a processor of a computing system, comprising a non-transitory computer readable storage medium having computer executable instructions embodied therewith, when executed by the processor on the computing system, the computer executable instructions cause the processor to perform:

initiating, by an operating system of the computing system, the creation of a list of top accessed registers of a plurality of architected registers in the processor, wherein each of the plurality of registers comprises a corresponding register usage counter;

initializing each of the plurality of register usage counters;

starting a register usage monitoring mode;

examining each of the plurality of the register usage counters, and updating the list of top accessed registers;

stopping the register usage monitoring mode; and updating, a register file partition assignment when the list of top accessed registers is identified;

wherein the examining each of the plurality of the register usage counters comprises:

setting a current register counter of the list of top accessed registers to 0;

incrementing the current register counter of the list of top accessed registers by one;

periodically searching for a register having highest value of register usage counter from a plurality of registers not on the list of top accessed registers while each of the plurality of register usage counters is incremented when the corresponding register is accessed;

checking if the register having highest value of register usage counter reaches or passes a predetermined threshold when the register is found;

adding the register found from the plurality of registers not in the list of top accessed registers to the list of top accessed registers when the register having highest value of register usage counter reaches or passes the predetermined threshold, and exiting current searching period when the register having highest value of register usage counter does not reach the predetermined threshold;

checking whether the list of top accessed registers reaches a predetermined maximum number of registers in the list of top accessed registers; and incrementing the current register counter of the list of top accessed registers and continuing periodic searching when the list of top accessed registers does not reach the predetermined maximum number of registers in the list of top accessed registers, and exiting the examining each of the plurality of the register usage counters when the list of top accessed registers reaches the predetermined maximum number of registers on the list of top accessed registers.

14. The computer program product of claim 13, wherein initializing each of the plurality of register usage counters comprises:

initializing one of the plurality of register usage counters to a minimal value;

initializing one of the plurality of register usage counters to a maximum value; and initializing one of the plurality of register usage counters to a predetermined value.

15. The computer program product of claim 14, further comprising incrementing the register usage counter when the register corresponding to the register usage counter is accessed, wherein the incrementing the register usage counter comprises:

decreasing the register usage counter value when the decrement counter is used; and increasing the register usage counter value when the increment counter is used.

16. The computer program product of claim 15, wherein a register is accessed:

when the register is read from;

when the register is written to; or when the register is read from or the register is written to.

17. The computer program product of claim 13, wherein updating the register file partition assignment comprises:

stopping the program currently running on the processor of computing system and bringing its threads of execution to quiescent;

comparing the list of top accessed registers against names of the registers of fully-ported register file partition;

moving registers between the fully-ported register file partition and a less-ported register file partition until all registers on the list of top accessed registers are in the fully-ported register file partition; and resuming executions of the program and its threads.

* * * * *